Feb. 14, 1939.　　　F. F. REYNOLDS　　　2,147,060
ELECTROMAGNETIC WAVE PICK-UP INSTRUMENT
Filed July 23, 1934　　　2 Sheets-Sheet 2

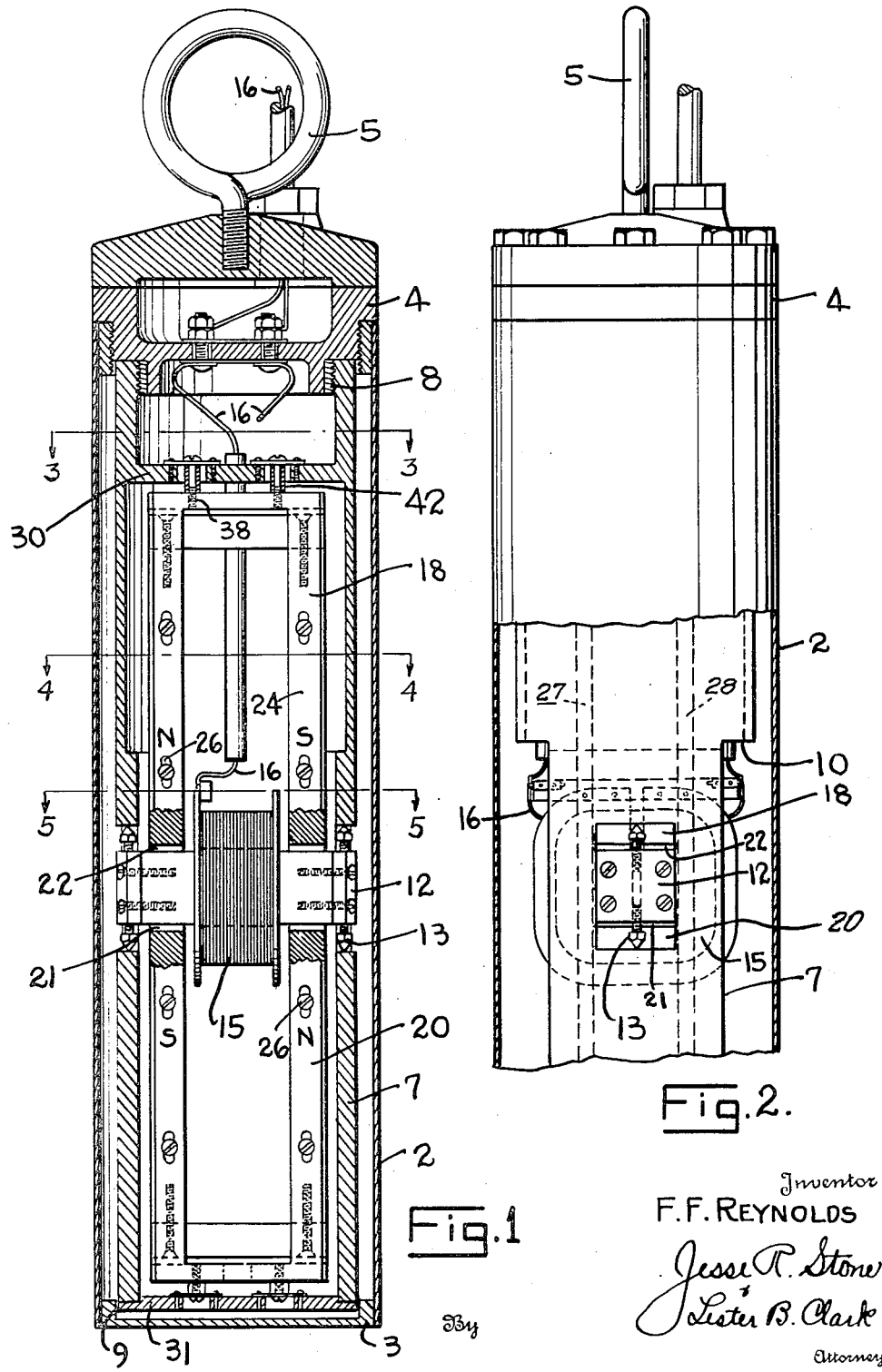

Inventor
F. F. REYNOLDS
By Jesse R. Stone
Lister B Clark
Attorneys

UNITED STATES PATENT OFFICE 2,147,060

ELECTROMAGNETIC WAVE PICKUP INSTRUMENT

Frank F. Reynolds, Houston, Tex., assignor to Seismic Explorations, Inc., Houston, Tex., a corporation of Louisiana Application July 23, 1934, Serial No. 736,562

6 Claims. (Cl. 177—352)

The invention relates to a means and method for securing critical damping of an electromagnetic pickup instrument.

In the art of geophysical prospecting and particularly by the use of seismic or sound waves it is necessary to pick up the impulses which have been broadcast, with a more or less delicate instrument, which instruments are usually set in shallow holes in the ground. Considerable difficulty has been encountered in the handling, adjustment, and construction of such instruments because of their delicacy and because of the necessity for accuracy and proper damping of the incoming impulses picked up by the instrument. Instruments of this character must be damped to eliminate interference from ground noises and the natural undamped frequency of vibration of the instrument. Various devices have been resorted to in an effort to obtain critical damping of instruments of this sort such as immersing parts of the instrument in a liquid bath. Even this expedient, however, involved difficulties because of the change of temperature and the resulting change in viscosity of the liquid which in turn effects the damping coefficient of the instrument to such an extent that accurate results were not obtainable over the general range of temperatures normally encountered in field practice.

It is one of the objects of the invention to provide a structure for critically damping an electromagnetic pickup instrument.

Another object of the invention is to suspend the electromagnets of an electromagnetic pickup instrument by means of a suitable spring support in order to obtain a critical damping action.

Another object of the invention is to provide a resilient member for supporting the electromagnets in a pickup instrument so that the air gap may be adjusted in order to control the natural period of operation of the instrument.

Still another object of the invention is to resiliently support the electromagnets of a pickup instrument so that the air gap may be varied in order to vary the damping coefficient of the instrument.

It is also an object of the invention to reduce the air gap of an electromagnetic pickup device with a view of providing the damping required in order to critically dampen the action of the instrument.

Other and further objects of the invention will be readily apparent when the following description is considered in connection with the accompanying drawings wherein:

Fig. 1 is a central vertical sectional view through an instrument constructed in accordance with the invention, and showing the arrangement of the parts.

Fig. 2 is a view taken at right angles to the section of Fig. 1 and showing parts of the structure broken away to illustrate the arrangement thereof.

Figure 3:
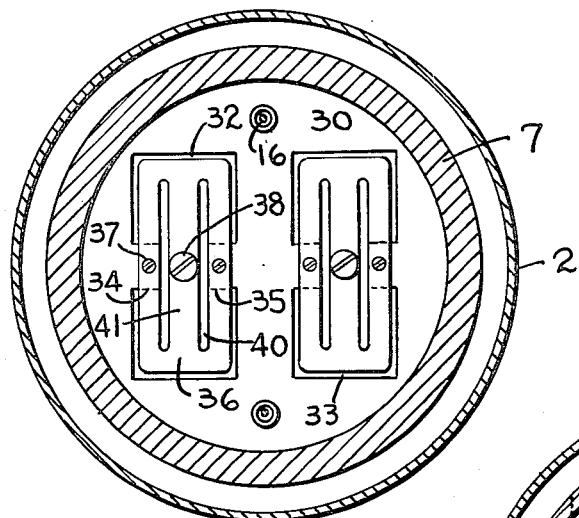
Figs. 3, 4 and 5 are sections taken on the corresponding section lines of Fig. 1 and showing the arrangement of the various parts of the instrument.

It is usual to incorporate an instrument of this sort in a housing or container such as 2 which is preferably fluid tight and is arranged so the ends thereof are closed by the base 3 and the cap 4. A suitable handle or other support 5 is connected to the cap so that the device may be transported or suspended during use.

Within the housing 2 is the frame 7 which is preferably suspended at 8 from the cap 4, and may engage the base 3 as at 9. This frame 7 is opened at the side thereof adjacent the middle at 10 in order to receive the armature 12, which is adjustably supported in the frame by means of the adjustable screw members 13. A plurality of these screws are provided above and below the armature so that it may be adjusted with respect to the frame for a purpose which will be later described.

Mounted on the armature 12 is the coil 15 which is wound with a suitable number of turns of appropriate wire in order to obtain the result desired. The coil 15 has conductors 16 attached thereto which lead to an oscillograph, not shown.

Within the frame 7 are mounted the magnets 18 and 20. These magnets are arranged in opposition to each other and spaced apart in the frame to provide the air gaps 21 and 22. By proper adjustment of the screws 13 the air gaps may be adjusted in order to balance the operation of the instrument.

The magnets 18 and 20 are in turn carried by a rectangular bracket generally designated as 24. The bracket 24 has front and rear legs 27 and 28, best seen in Figs. 4 and 5. The U-shaped magnets 18 and 20 are adapted to enter the space between legs 27 and 28 and to be adjustably secured therein by means of the slot and screw connections such as 26. By means of this construction the magnets may be adjusted longitudinally of the bracket 24 to vary the air gaps 21 and 22 as desired, and the position of the armature in frame 7 may be adjusted to equalize or balance the air gaps if necessary.

One of the essential features of the invention is the suspending of the magnet assembly which comprises the bracket 24 and the magnets 18 and 28 with respect to the casing 7.

As previously pointed out, it is desired to obtain a critical damping so that a constant damping coefficient for the normal range of temperature may be obtained. With this in view the casing 7 is provided with an upper partition 30 and a lower partition 31. The construction of these partitions insofar as the supporting of the frame or bracket 24 is concerned, is identical, and the construction of the partition 30 will be given.

This partition is best seen in plan view in Fig. 3 and is provided with two spaced openings 32 and 33. These openings are interrupted, however, by the outstanding supporting ears 34 and 35, one of which is spaced in each side intermediate the ends of the opening. Disposed on the lugs 34 and 35 is the spring plate 36. This plate is shown as attached to the lugs by suitable members 37 and in turn has an attaching bolt 38 extending therethrough connected to the bracket 24.

The spring plate 36 is of special construction in that it is provided with a pair of slots 40 in order to provide the necessary resiliency to the center bar 41 thereof. As will be apparent from this construction considerable resiliency is obtained and the effective spring length is that length between the screws 37 and 38, and around the end of one of the slots 40. It is to be understood that these spring plates 36 may be made of any desired material and of a suitable thickness in order to obtain the damping action desired in order to effect the vibration of the instrument.

The projections 42 on the bracket 24 receive the bolts or screws 38 and are of such length as to properly space the frame 24 within the frame 7. The spring plates are provided on all four of the connections shown in Fig. 1 between the bracket 24 and the supporting frame 7.

Figure 4:
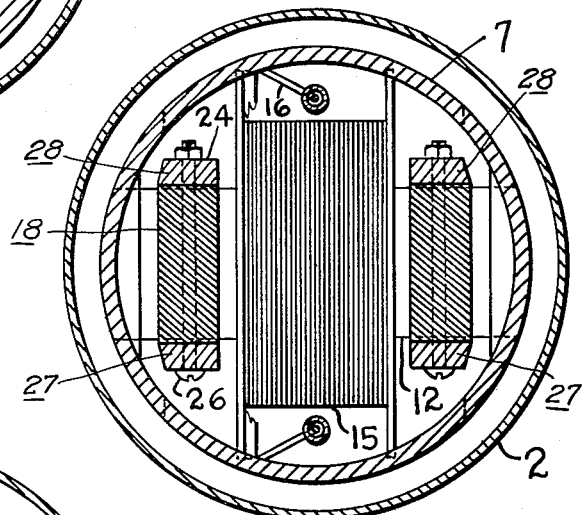

Fig. 4 shows the arrangement of the magnets in the bracket 24 and their positioning with respect to the frame 7 and the coil 15.

Figure 5:
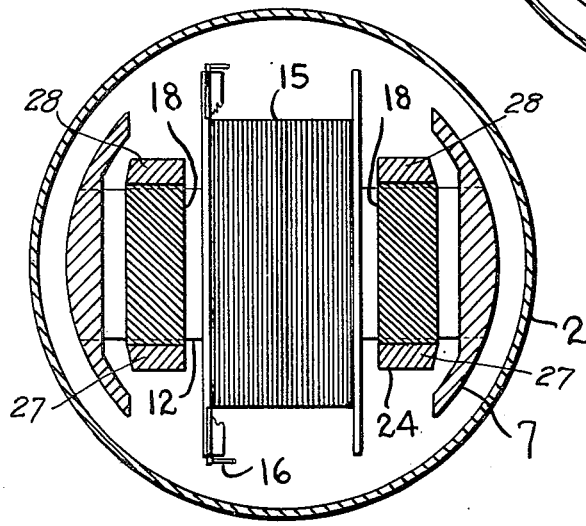

Fig. 5 shows a construction illustrating how the frame 7 is cut away to permit the positioning of the armature, the induction coil and magnet.

It will be understood that the air gap is not to be reduced beyond practical limits such as would cause a sticking of the magnets and armature, but that the value of the air gap can be reduced materially to balance the moving masses to a point where critical damping is secured and whereby it is possible to vary the natural frequency of the instrument over a narrow range so as to give the instrument a desirable change in frequency without necessitating a change in the springs used or the value of the mass of the magnets.

It is contemplated that the magnetic system will in general remain stationary due to the inertia of the mass, and that any component of sound or seismic waves impinging along the longitudinal axis will cause the frame 7 to move and in this manner reproduce the motion of the waves.

It will be observed that the two magnetic poles at one end of the armature 12 are of opposite polarity, and therefore that the magnetic flux due to the top magnet is in opposite direction to that due to the lower magnet. Consequently when the armature 12 is displaced in the air gap by sound impulses the net magnetic flux varies accordingly and induces an electromotive force in the coil 15, which will be recorded by an oscillograph.

It has been found that with a construction of this sort a critical damping action may be obtained with the instrument because of the resilient action of the springs and the fact that the air gaps may be materially reduced. The reduction of the air gaps is of advantage because is has the effect of reducing the magnitude of the damping action required and in a sense serves to reduce the apparent mass of the magnets to such an extent that the damping due to the electromagnetic forces present and to the air inside of the case serves to cause critical damping of the instrument. These improvements result in the elemination of the use of a liquid for damping and result in a substantially constant damping cofficient throughout the range of temperatures normally encountered in field practice.

What is claimed is:

1. In an electromagnetic sound wave pickup device the combination of a frame, a mass, a spring plate, a resilient bar therein, means to connect said mass to the center of said bar, side bars on said plate each of said side bars having its ends attached to the ends of said first mentioned bar and means to connect the centers of said side bars to said frame whereby resiliency is obtained due to the flexibility of one half the length of each of said bars.

2. In an electromagnetic wave pickup device for elastic waves, a casing adapted to be vibrated by elastic waves, a frame within and attached to said casing, an inertia member within said frame, said member comprising a magnet having an air gap, an armature, means mounting said armature transversely of said frame, and a flexible connection between said inertia member and said frame to support the inertia member with the armature in the air gap and permitting relative displacement therebetween, said flexible connection comprising an elongated plate having parallel slots longitudinally thereof for a portion of the length of the plate, the sides of the plate being connected centrally to said frame and the middle of the plate being connected centrally to said bracket, and a coil about said armature.

3. An electromagnetic wave pickup device for elastic waves comprising a casing, a frame within said casing, and attached thereto whereby the casing and frame may be vibrated by elastic waves, said frame having a transverse opening intermediate its ends, an armature positioned in said opening and having adjusting screws extending vertically therefrom to engage the walls of the opening and adjustably fix the armature within the opening, a pair of magnets within said frame, an elongated bracket for the magnets extending longitudinally of the frame and having spaced side legs which pass on opposite sides of the armature and magnets, a slot and screw connection between said legs and magnets for adjustably securing the magnets within the bracket, a coil encircling said armature, and plate springs yieldably connecting the ends of the bracket to the ends of the frame.

4. An electromagnetic wave pickup device comprising an elongated frame having a transverse opening intermediate its ends, an armature extending transversely of the frame in said opening, adjusting screws in the ends of said armature and extending longitudinally of the frame to adjustably position the armature within the opening, a coil encircling said armature, an elongated inertia member within said frame, and plate springs connecting the ends of said member to the ends of said frame, said inertia member comprising a rectangular bracket having spaced side legs passing on opposite sides of the armature, a pair of U-shaped magnets in said bracket with their pole pieces adjacent the upper and lower faces of the armature, and a slot and screw connection between the legs of the bracket and the magnets whereby the position of the armature and the magnets may be adjusted to secure critical damping and desired natural frequency of vibration.

5. An electromagnetic sound wave pickup device comprising a housing, a frame fixed therein, an armature, means adjustably mounting said armature on said frame transversely of the frame, a bracket in said frame, plate springs mounted on said frame and connected to said bracket to resiliently support said bracket, and a permanent magnet on said bracket with its poles adjacent said armature, each of said spring plates being slotted with said casing connected on one side of a slot and said frame connected at the other side of said slot.

6. An electromagnetic sound wave pickup device comprising a housing, a frame therein, an armature, means adjustably mounting said armature on said frame transversely of the frame, a bracket in said frame, plate springs mounted on said frame and connected to said bracket to resiliently support said bracket, and a permanent magnet on said bracket with its pole faces adjacent said armature, each of said spring plates being provided with spaced parallel slots with said frame connected on the sides and said bracket connected at the center, and the ends thereof being free so that the effective spring length is twice that of the slot.

FRANK F. REYNOLDS.